Sept. 12, 1972　　　　　W. C. PIPPEN　　　　　3,691,070

EMPLOYMENT OF BENTONITE IN BRINE MUDS

Filed April 27, 1970

INVENTOR
WILLIAM C. PIPPEN

BY Delman H. Jansen

AGENT 3,691,070
EMPLOYMENT OF BENTONITE IN BRINE MUDS
William C. Pippen, Lafayette, La., assignor to National Lead Company, New York, N.Y.
Filed Apr. 27, 1970, Ser. No. 32,054
Int. Cl. C10m 3/02
U.S. Cl. 252—8.5 B
2 Claims

ABSTRACT OF THE DISCLOSURE

A brine drilling mud is formed by a two-step process comprising prehydrating bentonite with fresh water in an axial, positive displacement pump so as to form a prehydrated bentonite-water mixture, which is subsequently incorporated with the brine phase so as to form the desired brine mud.

---

Figure 1:
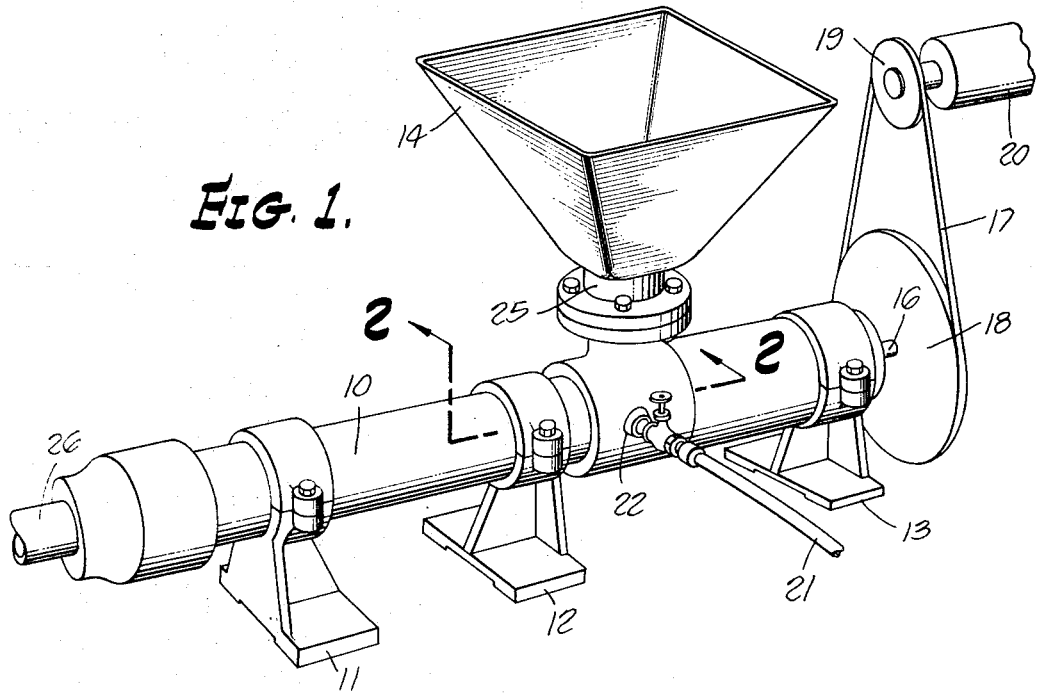

This invention relates to the compounding of aqueous drilling fluids, and more particularly to a process for prehydrating bentonite for mixing with an inhibited mud.

In the rotary drilling of wells for oil and gas and the like, a fluid is circulated down hollow drilling pipe to the bottom of the bore hole, whence it issues through orifices in the bit and rises in the annular space between the drill pipe and the walls and/or casing of the hole. At the surface the fluid is freed of the cutting produced by the bit and which have been lifted to the surface by the flow of the fluid. The drilling fluid, or the drilling mud as it is often called, is then recirculated in the fashion already described, this circulation being substantially continuous during the course of drilling.

In the early history of such rotary drilling, drilling muds were frequently made with surface clays and water. Later the technique was developed of increasing the density of such muds with weighting agents, such as finely ground barite; and still later bentonite came to be used in place of or as a supplement to ordinary clays, for the special advantages contributed by its highly colloidal and highly-swelling nature.

In some environments, simple fresh water drilling muds are not suitable or in some cases not practicable. Thus, it is frequently desirable to increase the electrolyte content of drilling muds by adding various salts, such as sodium chloride, potassium chloride, calcium chloride, and the like. These are used among other reasons for the sake of their lesser reactivity with shale cuttings and with interstitial clays in oil-bearing zones and indeed with shaly formations drilled through. In many localities, fresh water is available only with difficulty, and natural brines, brackish water or sea water may be used for making up the drilling mud.

When such muds as have been just described, i.e., muds having a higher electrolyte content than fresh or potable water, and which are termed in the drilling industry brine muds, are used, the ordinary technique of adding dry powdered bentonite to them so as to improve their filtration qualities and their rheological properties no longer suffices. The bentonite is rendered more or less inert, as indeed might be expected from the fact that brine muds are often deliberately compounded so as to be inert towards swelling shale and the like.

One method of overcoming this problem is to make a slurry of the bentonite in fresh water, wherein the bentonite swells and disperses in the normal fashion. This slurry is then added to the brine mud, whereupon it is found that the bentonite contributes substantially to the desired improvement in properties, particularly as regards filtration and flow characteristics, even though in some cases at a somewhat reduced efficiency. The difficulty with this prior art procedure, however, is that it is difficult to work with a bentonite-fresh water slurry containing much more than about 10% bentonite because of its high viscosity.

An object of the present invention is to provide a procedure for prehydrating bentonite and incorporating it in brine drilling muds so as to obtain the benefits imparted by the bentonite while at the same time avoiding the mechanical difficulties associated with highly concentrated bentonite-water mixtures.

Other objects of the invention will appear as the description thereof proceeds.

In the drawings, FIG. 1 is a perspective view of the mixer-pump used in the invention.

Figure 2:
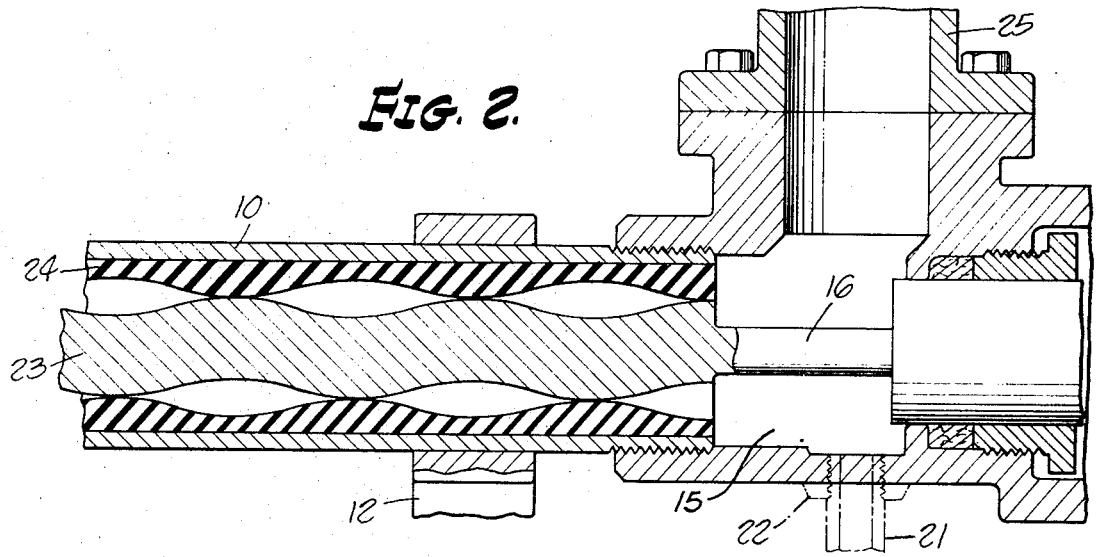

FIG. 2 is a fragmentary sectional view taken as shown by the arrows in FIG. 1, and showing the inlet portion of the pump and a portion of the helical, positive displacement pumping element.

Generally speaking, and in accordance with illustrative embodiments of my invention, I pass the dry powdered bentonite together with water into the inlet of an axially rotary, helical, positive displacement pump, from whence it emerges as a slurry or paste which is sufficiently hydrated as regards the individual particles of bentonite that when it is subsequently added to a brine drilling mud the bentonite confers thereon the benefits of hydrated bentonite rather than the benefits (or more properly the lack of benefits) of dry bentonite. The dry powdered bentonite is the common material so widely used in drilling muds, and is generally ground so that about 90% pases a 200-mesh screen, although both coarser and finer material may be used, such as 80-mesh to 325-mesh material. The water should be essentially fresh, so that it should not have an electrolyte content substantially in excess of about ½% sodium chloride equivalent.

The axially rotary, helical, positive displacement pump previously mentioned and which I use in accordance with the invention is commercially available, and is constructed and operates as set forth in Moineau Pat. 2,085,-115, the contents of which are hereby incorporated herein by reference. Such pumps are available under the registered trademark name of "Moyno." As expressed in the aforementioned Pat. 2,085,115, this pump comprises at least three helical gear elements, disposed the one within the others, each element having one helical thread more than the element immediately inside same, the threads of the enveloped elements being always in contact in each cross section with the threads of the corresponding enveloping element and the ratio of the different pitches of these threads being equal to the ratio of the number of threads in said elements.

In order to facilitate simultaneously passing the bentonite together with water into the pump, I provide the helical pump portion with a hopper and I attach a water line so that water enters below the hopper. Referring to the drawings, FIG. 1, 10 indicates the helical pump portion of the device, which is carried by mounting brackets 11, 12, and 13. The open top hopper 14 discharges at the bottom into the inlet section 15 of the pump, which is traversed by the pump shaft 16, which in turn is driven through a belt 17 and pulleys 18 and 19 by a motor means 20 indicated schematically in the drawings.

As will be seen from FIG. 1, the water line 21 preferably enters the inlet portion 15 of the pump at the side. This inlet 22 is shown in phantom in FIG. 2, since its axis is at right angles to the hopper's axis, as indeed shown in FIG. 1. A portion of the rotor 23 and the stator 24 of the axially rotary, helical, positive displacement pump is shown in FIG. 2. This construction provides for a delimited space which continuously moves axially as the rotor 23 is rotated so as to provide the positive displacement characteristic of this type of pump. A detailed analysis of the mechanical action is given in the Moineau patent already referred to, although an understanding of that mechanism is not essential to the understanding of the present invention.

Reverting to the inventive procedure, dry powdered bentonite is dumped into the hopper 14 whence it passes through the throat 25 of the hopper down into the inlet portion 15 of the pump, where it is simultaneously contacted with water entering through inlet 22 and conveyed longitudinally through pump portion 10, whence it emerges as a slurry or paste at the outlet 26, which may conveniently be a hose or like pipe-line which conveys the paste or slurry to the brine.

I prefer to add the bentonite and the water to the pump in the manner described in the relative proportions of from about 25 to about 120 pounds of the bentonite per barrel of water. The barrel is that standard in oil field practice and contains 42 U.S. gallons. A barrel of water thus weighs 350 pounds. If a lesser amount than about 25 pounds of bentonite is used per barrel of water, then dilution of the brine is excessive; whereas if more than about 120 pounds of bentonite were used per barrel of water, the paste becomes so thick as to become impractical.

My invention is equally adapted to the formation of a brine mud containing nothing other than the brine and the added bentonite; as well as to the addition of bentonite in the manner described to an already existing brine mud, which may contain in addition to the aqueous phase thereof, which is the brine, solids such as clays, previously added bentonite, cuttings from the drilling operation, shale and silt incorporated from drilling, added weight material, such as barite, oil added as an emulsified phase, and the like. It will be appreciated that in either case, the bentonite-fresh water mixture may be considered as added to the brine, whether or not the brine already has additional solids present.

The bentonite used in my invention is common oil field bentonite, which is the so-called swelling type and in the United States is commonly designated as Wyoming bentonite or sometimes Wyoming type bentonite, since the commercial deposits extend into South Dakota. The specifications for this material have been standardized by the American Petroleum Institute. Similar bentonites are found elsewhere throughout the world.

Some examples of the invention will now be given.

Commercial oil field bentonite, of Wyoming-South Dakota origin, was passed through a pump as described and shown in the drawings with water so as to form a slurry or paste containing 7.84% by weight bentonite, corresponding to 36.5 pounds of bentonite per barrel of water, at an output of 13 gallons per minute. When this was incorporated with a brine mud consisting of saturated salt water containing 1.48 pounds of commercial causticized ferrochrome lignosulfonate per barrel, it resulted in a mud having a plastic viscosity of 5 centipoises and a yield point of 18 pounds per hundred square feet, as well as a 10 second gel strength of 12 pounds per hundred square feet. These values were determined in accordance with the standard procedure of the American Petroleum Institute. When the experiment was repeated with everything the same except that sea water was substituted for saturated salt water, the corresponding figures were 3, 6, and 5.

The water added in the form of the prehydrated bentonite paste contributed approximately ¼ of the volume of the mud produced.

The experiment was repeated except that the bentonite and water were passed through the pump in the relative proportions of 41.5 pounds of bentonite per barrel of water. This was added to two different muds, each consisting of 2 pounds of commercial causticized ferrochrome lignosulfonate per barrel of saturated salt water in one case and sea water in the other, in the proportions of 37.4 pounds of dry bentonite per barrel of mud. The corresponding figures for the saturated salt water mud were 8, 60, and 28; and for the sea water mud were 5, 22, and 16.

As a further example, bentonite from Algeria and meeting the American Petroleum Institute drilling fluid material specifications for bentonite, is passed through a pump as described and shown in the drawings with water in the relative proportions of 80 pounds of bentonite for each 350 pounds of said water. The emergent slurry is divided into two portions. The first portion is added to a calcium chloride brine containing 10% calcium chloride by weight, so as to form an inhibited drilling fluid of adequate characteristics for this use. Sufficient slurry is added to this brine to impart 30 pounds of bentonite on a dry weight basis per barrel of the completed brine mud.

The second portion of the slurry prepared in the manner described is incorporated into an existing drilling mud containing approximately 15 pounds per barrel of atapulgite clay and approximately 1 pound per barrel of sodium carboxymethyl cellulose, together with about 2 pounds per barrel of drilled-up formation fluids comprising mostly limestone and silica, the water phase being a brine saturated with sodium chloride and containing in addition about 1% calcium chloride. The slurry is added to this brine mud so as to give about 40 pounds of bentonite on a dry weight basis per barrel of the completed, treated brine mud.

It may be noted that the axially rotary, helical, positive displacement pump described and used in accordance with the invention is quite special in its action on the bentonite and water passed through it. In the first place, because of the positive displacement nature of the pump action, there is no holdup or loss of pumping efficacy as would happen if the same proportions of bentonite were passed, for example, through a conventional extruder having a worm screw in a cylindrical housing. Bentonite when wetted is so slippery and tends to pack so that extruders of this type simply do not function properly.

Another remarkable advantage of the procedure in accordance with the invention is that the emerging slurry or paste is quite fully prehydrated for the purpose at hand, viz., for dispersion into a brine. It is not necessary to place the emerging slurry or paste in a holding vessel to permit further hydration to take place before it is added to the brine. This makes the procedure of the invention particularly adaptable to installations where space is at a premium, as for example in off-shore drilling installations.

It may be also pointed out that the prehydrated bentonite-water bixture made in accordance with the invention has other uses than those already described. For example, it may be incorporated into cement slurries, such as are used in oil-well cementing, to impart the desirable properties of bentonite thereto in an enhanced fashion.

It will be appreciated that while the invention has been described with the aid of numerous specific examples, rates, proportions, and the like, I wish it to be understood that I do not desire to be limited to the exact details of procedure shown and described, for obvious modifications will occur to a person skilled in the art.

Having described my invention, I claim:

1. The process of forming a drilling mud having an aqueous phase of brine and containing bentonite which comprises the steps of passing said bentonite together with fresh water in the relative proportions of from about 25 to about 120 pounds of said bentonite per 350 pounds of said water into an axially rotary, helical, positive displacement pump so as to form a prehydrated bentonite-water mixture, and subsequently passing said mixture into said brine in such proportions as to add from about 3 to about 40 pounds of bentonite, dry weight basis, per barrel of said brine so as to form a dispersion of said hyrated bentonite in said brine mud, said pump comprising at least three helical gear elements, disposed the one within the others, each element having one helical thread more than the element immediately inside same, the threads of the enveloped elements being always in contact in each cross section with the threads of the corresponding enveloping element and the ratio of the different pitches of these threads being equal to the ratio of the number of threads in said elements.

2. A process of prehydrating bentonite with water with from about 25 to about 120 pounds of said bentonite per 350 pounds of said water which comprises passing said bentonite together with said water into an axially rotary, helical, positive displacement pump and discharging said prehydrated bentonite as a pumpable product, said pump comprising at least three helical gear elements, disposed the one within the others, each element having one helical thread more than the element immediately inside same, the threads of the enveloped elements being always in contact in each cross section with the threads of the corresponding enveloping element and the ratio of the different pitches of these threads being equal to the ratio of the number of threads in said elements.

References Cited

UNITED STATES PATENTS

| | | | |
|---|---|---|---|
| 2,044,757 | 6/1936 | Cross | 252—314 |
| 3,360,461 | 12/1967 | Anderson et al. | 252—8.5 C |
| 2,085,115 | 6/1937 | Moineau | 74—466 |

OTHER REFERENCES

Rogers, Composition and Properties of Oil Well Drilling Fluids, third edition, Pub. 1963, Gulf Pub. Co. of Houston, Tex., pp. 354–361.

HERBERT B. GUYNN, Primary Examiner

U.S. Cl. X.R.

252—314

PO-1050
(5/69)

UNITED STATES PATENT OFFICE
CERTIFICATE OF CORRECTION

Patent No. 3,691,070            Dated September 12, 1972

Inventor(s) WILLIAM C. PIPPEN

It is certified that error appears in the above-identified patent and that said Letters Patent are hereby corrected as shown below:

William C. Pippen
Assignor to N L INDUSTRIES, INC.

Signed and sealed this 10th day of April 1973.

(SEAL)
Attest:

EDWARD M. FLETCHER, JR.            ROBERT GOTTSCHALK
Attesting Officer            Commissioner of Patents